US009317029B2

(12) United States Patent
Morfino et al.

(10) Patent No.: US 9,317,029 B2
(45) Date of Patent: Apr. 19, 2016

(54) PREDICTIVE CONTROL AND VIRTUAL DISPLAY SYSTEM FOR A NUMERICALLY CONTROLLED MACHINE TOOL

(75) Inventors: Giuseppe Morfino, Pino Torinese (IT); Carla Francese, Turin (IT); Mario Vesco, Baldissero Torinese (IT); Edoardo Ghezzo, Turin (IT)

(73) Assignee: FIDIA S.p.A., Torinese (IT)

( * ) Notice: Subject to any disclaimer, the term of this patent is extended or adjusted under 35 U.S.C. 154(b) by 778 days.

(21) Appl. No.: 13/561,334

(22) Filed: Jul. 30, 2012

(65) Prior Publication Data

US 2012/0290122 A1    Nov. 15, 2012

Related U.S. Application Data

(63) Continuation of application No. PCT/IB2011/053512, filed on Aug. 5, 2011.

(30) Foreign Application Priority Data

Aug. 6, 2010    (IT) .............................. TO2010A0683

(51) Int. Cl.
*G06F 19/00*    (2011.01)
*G05B 19/04*    (2006.01)
(Continued)

(52) U.S. Cl.
CPC .. *G05B 19/4069* (2013.01); *G05B 2219/32351* (2013.01); *G05B 2219/35304* (2013.01); *G05B 2219/35306* (2013.01); *G05B 2219/35311* (2013.01)

(58) Field of Classification Search
CPC .............. G05B 17/00; G05B 19/4068; G05B 19/4069; G05B 19/4097; G05B 2219/35311; G05B 2219/35316; G05B 2219/36252; G05B 2219/40131; G05B 2219/49143
USPC ......... 700/83, 95, 97, 98, 103, 118, 159, 160, 700/174, 177, 178, 180, 182, 184, 186, 245, 700/250, 255; 703/6, 7, 13, 20; 717/120, 717/127, 135; 318/560, 567, 569, 570, 571
See application file for complete search history.

(56) References Cited

U.S. PATENT DOCUMENTS 5,602,453 A * 2/1997 Sekikawa ...................... 318/570
5,808,432 A   9/1998 Inoue et al. ................... 318/561
(Continued)

FOREIGN PATENT DOCUMENTS

JP    02-36048       2/1990    ............. B23Q 15/00
JP    H02-151908 A   6/1990    ............ G05B 19/403
(Continued)

OTHER PUBLICATIONS

Canadian Intellectual Property Office, Office Action dated Sep. 13, 2013, pertaining to Application No. 2,784,720, 4 pages.
(Continued)

*Primary Examiner* — Crystal J Barnes-Bullock
(74) *Attorney, Agent, or Firm* — Sunstein Kann Murphy & Timbers LLP

(57) ABSTRACT

A numerically controlled machine tool, and method for control thereof, to display virtual two-dimensional future positions to be adopted by a workpiece and by the machine tool in a pre-set predictive time window. The system and method calculate target coordinate values defining positions of the tool along axes of the machine tool on the basis of a machining program. While machining is in progress, a processor receives the calculated target coordinate values to generate and display image data on the basis of the target coordinate values and of stored mathematical models of the machine, of the workpiece, and of the tool.

18 Claims, 4 Drawing Sheets

(51) Int. Cl.
  *G05B 19/18* (2006.01)
  *G06F 9/44* (2006.01)
  *G05B 19/4069* (2006.01)

(56) References Cited

U.S. PATENT DOCUMENTS

| | | | |
|---|---|---|---|
| 6,546,127 B1 | 4/2003 | Seong et al. | 382/152 |
| 7,174,225 B2 * | 2/2007 | Dolansky | 700/26 |
| 7,899,574 B2 * | 3/2011 | Ogawa | 700/178 |
| 8,175,861 B2 * | 5/2012 | Huang et al. | 703/13 |
| 8,725,283 B2 * | 5/2014 | Gray et al. | 700/186 |
| 2002/0133264 A1 * | 9/2002 | Maiteh et al. | 700/182 |
| 2002/0164221 A1 | 11/2002 | Izutsu et al. | 409/132 |
| 2004/0154157 A1 | 8/2004 | Hessbruggen et al. | 29/563 |
| 2005/0102054 A1 | 5/2005 | Dolansky | 700/182 |
| 2005/0209730 A1 | 9/2005 | Grund et al. | 700/186 |
| 2010/0063616 A1 | 3/2010 | Mori et al. | 700/160 |
| 2011/0035044 A1 | 2/2011 | Takahashi et al. | 700/178 |

FOREIGN PATENT DOCUMENTS

| | | | |
|---|---|---|---|
| JP | 06-102923 | 4/1994 | G05B 19/407 |
| JP | H07-302108 A | 11/1995 | G05B 19/4097 |
| JP | 2003-022110 A | 1/2003 | G05B 19/409 |
| JP | 2004-38565 | 2/2004 | G05B 19/4063 |
| JP | 2004-126956 | 4/2004 | G05B 19/18 |
| JP | 2004-227047 | 8/2004 | G05B 19/4069 |
| JP | 2005-107854 A | 4/2005 | G05B 19/4069 |
| JP | 2006-139506 | 6/2006 | G05B 19/4069 |
| JP | 2006-309588 | 11/2006 | G05B 19/4093 |
| JP | 2007-133787 | 5/2007 | G05B 19/4069 |
| JP | 2009-075702 | 4/2009 | G05B 19/4069 |
| JP | 2010-134776 | 6/2010 | G05B 19/18 |
| WO | WO 03/019454 A1 | 3/2003 | G06F 19/00 |
| WO | WO 2009/027664 A1 | 3/2009 | G05B 19/4099 |
| WO | WO 2009/130759 | 10/2009 | G05B 19/414 |
| WO | WO 2009/158559 A1 | 12/2009 | G05B 17/02 |
| WO | WO 2012017419 A1 * | 2/2012 | |

OTHER PUBLICATIONS

Russian Intellectual Property Office, Office Action dated Nov. 7, 2013, pertaining to Application No. 2012125163/08, 6 pages.
Russian Intellectual Property Office (English Translation), Office Action (Inquiry) of the Substantive Examination dated Nov. 7, 2013, pertaining to Application No. 2012125163/08(038524), 5 pages.
Final Russian Official Action, Application No. 2012125163/08(038524) 5 pages, May 16, 2014.
Final Russian Official Action, Application No. 2012125163/08(038524) 5 pages, May 16, 2014 (English Translation).
Japanese Office Action, 2012-545520, 4 pages.
Japanese Official Action, Application No. 2012-545520, 4 pages, Jul. 22, 2014.
Japanese Official Action, Application No. 2012-545520, 3 pages, Jul. 22, 2014 (English Translation of Final Notice of Reasons for Rejection).
Bassi, Luca Authorized Officer European Patent Office, International Search Report of the International Searching Authority—International Application No. PCT/IB2011/053512, dated Aug. 12, 2011, 4 pages.
Roth, Surface Swept by a Toroidal Cutter During 5-Axis Machining, Computer-Aided Design, 33, (2001), pp. 57-63.
Richter, Auto Grind, Cutting Tool Engineering Magazine, vol. 54, No. 1, Jan. 2002, 5 pages.
LabView Simulation Module User Manual, National Instruments, Part No. 371013A-01, Apr. 2004 Edition, 14 pages.
Brief Communication, European Patent Office, Fidia S.p.A., Application No. 11755136.6-1807/2499543, Sep. 15, 2015, 13 pages.

* cited by examiner

PREDICTIVE CONTROL AND VIRTUAL DISPLAY SYSTEM FOR A NUMERICALLY CONTROLLED MACHINE TOOL

PRIORITY

This application is a continuation of Patent Cooperation Treaty Application PCT/IB2011/053512, entitled "A Predictive Control and Virtual Display System For A Numerically Controlled Machine Tool," filed Aug. 5, 2011, and naming Giuseppe Morfino, Carla Francese, Mario Vesco, and Edoardo Ghezzo as inventors, the disclosure of which is incorporated herein, in its entirety, by reference.

The Patent Cooperation Treaty Application PCT/IB2011/053512, in turn, claims priority from foreign patent application number TO2010A000683, filed Aug. 6, 2010, and naming Giuseppe Morfino, Carla Francese, Mario Vesco, and Edoardo Ghezzo as inventors, the disclosure of which is incorporated herein, in its entirety, by reference.

TECHNICAL FIELD

The present invention relates in general to the field of numerically controlled machine tools.

BACKGROUND ART

There are known control systems for machine tools which have image display devices and which permit the real-time display of real or virtual images that show the workpiece and the tool in their instantaneous positions.

A control and display system for a numerically controlled machine tool is also known, such as the system described in U.S. Pat. Appl. No. 2010/00063616A1, which is incorporated by reference herein in its entirety. The control and display system generally obtains by one or more video cameras or by virtual images obtained by calculation and selectively displays the images. Typically, real images are displayed when no cooling liquid is being supplied into the working zone of the machine whereas virtual images are displayed when the supply of cooling liquid is in progress.

Known control and display systems also permit the display of real or virtual images of what is happening in the work zone at the time in question.

Systems for simulating machining programs are also known; these validate the paths of the tools before they are sent to the machine. In many fields, for example in the machining of moulds, the machine operator often introduces into the numerical controller transformations to be applied to the machining program (for example, translations, rotations, scale factors, corrections of the radius of the tool, etc.) which, naturally, cannot be checked by the simulation systems.

SUMMARY OF THE EMBODIMENTS OF THE INVENTION

In accordance with embodiments of the invention, a control and virtual display for a machine tool for use while machining is in progress is provided. The machine tool includes a holder for a tool, a carrier for a workpiece to be machined by the tool and actuator devices associated to and controllable by a drive to bring about relative displacements between the tool and the workpiece along respective axes. The machine tool may further include a numerical controller that is configured to connect to the drive and to implement a machining program that is predetermined according to the features of the workpiece to be produced and the features of the tool. The numerical controller may calculate, on the basis of the machining program, target coordinates defining positions of the tool along the axes and positions to be reached by the activation of the associated actuator devices.

The control and virtual display system may further include an image display and a processing system. The processing system interfaces to the numerical controller to receive the calculated target coordinate values. While machining is in progress, the processing system generate image data from the target coordinate values based on stored mathematical models of the machine, the workpiece, and the tool. The image data may be suitable for producing on the image display, a virtual two-dimensional representation of positions which will be adopted by the workpiece and by the machine tool in a pre-set predictive time window.

The processing system may be configured to selectively generate image data including instantaneous virtual two-dimensional representations of the current positions of the workpiece and of the tool. The image data may be suitable for use on an image display. The generation of the image data may be in real time. The processing system may be configured to check whether the positions to be adopted by the workpiece and the machine tool are likely to cause a collision. When the calculated future positions of the tool are likely to cause a collision, the system may emit an alarm signal and/or direct the machining to be stopped.

The processing system may be configured to calculate a total amount of material to be removed from the workpiece in the pre-set predictive window or a total remaining amount of material still to be removed from the workpiece up to the completion of the machining within the pre-set predictive window. The processing system may also calculate a predicted quantity of excess material to be removed from the workpiece. The system may then calculate and adjust the speed of advance of the tool on the basis of the volume of material removed from the workpiece. The system may also adjust the speed based on the nature of the material, the kind of tool used, and the features of the machine tool. The processing system may also estimate the remaining useful life of the tool.

The processing system may be configured to present the virtual image of the predictive window set in increments. The processing system may present the virtual image while the machining program is being carried out.

The control and virtual display system may further include a setting for selecting the extent of the desired predictive window.

In another embodiment, a method of operation is presented. The method includes the step of receiving a machining program for a machine tool. The method then includes the step of calculating, via a processor, target coordinate values based on the machine program where the target coordinate values define positions of the tool along axes of the machine. While machining is in progress, the method includes the step of generating image data based on the target coordinate values and stored mathematical models of the machine tool, the workpiece, and the tool. The image data is a virtual two-dimensional representation of the positions to be adopted by the workpiece and by the machine tool in a pre-set predictive time window. The method then includes displaying the image data.

In another embodiment, a computer program product for controlling a machine tool is provided. The computer program product includes a non-transitory computer-readable medium having stored computer readable program code. The program code is configured to receive a machining program for a machine tool. The program code is configured to then calculate, via a processor, target coordinate values based on the machine program where the target coordinate values define positions of the tool along axes of the machine. The program code is configured to, while machining is in progress, generate image data based on the target coordinate values and stored mathematical models of the machine tool, the workpiece, and the tool. The image data is a virtual two-dimensional representation of the positions to be adopted by the workpiece and by the machine tool in a pre-set predictive time window. The program code is configured to then display the image data.

BRIEF DESCRIPTION OF THE DRAWINGS

Further characteristics and advantages of the embodiment will become clear from the following detailed description which is given purely by way of non-limiting example with reference to the appended drawings, in which.

DETAILED DESCRIPTION OF EMBODIMENT

Figure 1:
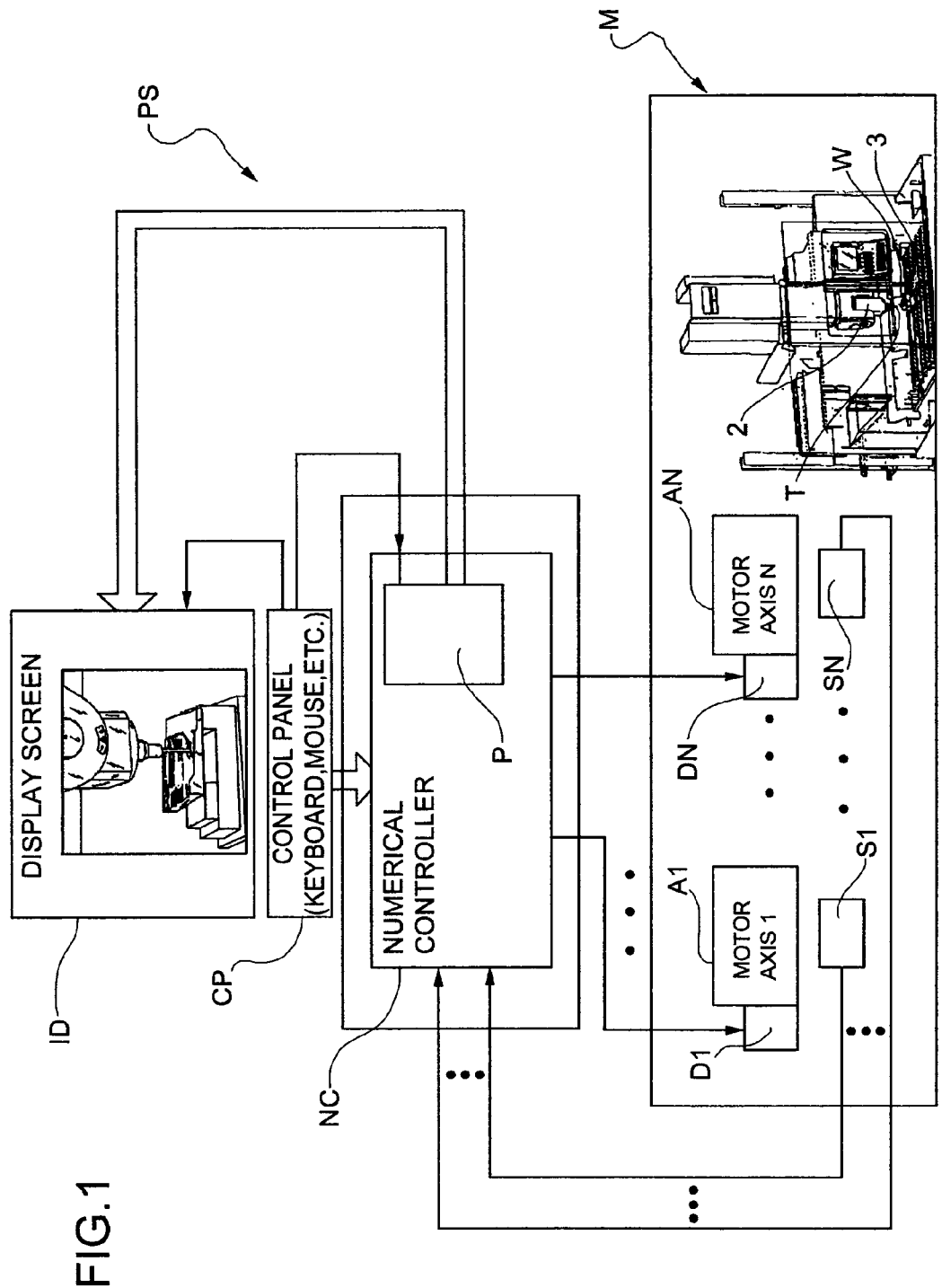
FIG. 1 is a block diagrams of an embodiment of a control and virtual display system for a machine tool according to the present embodiment.

The present embodiment may displays the movements of the axes of the machine tool downstream of all of the transformations set by the operator and enables them to be checked graphically before being executed in the machine to allow any potential error to be detected and hence to prevent damage to the tool, to the workpiece, or to the machine.

The present embodiment is a control system for a machine tool which includes, in known manner: a holder for a tool, a carrier for a workpiece to be machined by the tool, and a plurality of actuator devices which may be controlled by associated drive in order to bring about controlled relative displacements between the tool and the workpiece along respective axes. The control system includes a numerical controller which is connected to the drive and is suitable for implementing a machining program that is predetermined according to the features of the workpiece to be produced and to the features of the tool used. The numerical controller is suitable for calculating, on the basis of the machining program, target coordinate values defining positions of the tool along the axes, which positions are to be reached by the activation of the associated actuator devices.

The present embodiment may also provide an improved control and display system which permits a preliminary graphic examination of the movements which will be performed by the machine tool as soon as the operator imparts the command to start the machining program.

According to the embodiment, the control system of the type defined above, further includes an image display, and a processing system. The processing system is incorporated in and/or connected to the numerical controller in order to receive the calculated target coordinate values, and which is arranged to generate, on the basis of the target coordinates and of stored mathematical models of the workpiece, of the tool, of the clamping arrangements, and of the machine tool itself. The image data is suitable for producing on the display a predictive, virtual, two-dimensional representation of the positions which will be adopted by the workpiece and by the tool, up to a preselected future moment.

The operator of the machine tool can thus define a window for the checking and display of the movements which will be performed at subsequent times by setting the number of execution blocks or the amount of space (distance travelled) which the system will have to display and check in advance. This concept will be referred to below by the term predictive window.

Execution block refers to the elemental execution unit of a machining program. A machining program is essentially a file constituted mainly by a series of instructions for movement of the axes, each of which translates into a series of elemental movements (or execution blocks) of the machine tool.

By virtue of these features, the control and virtual display system according to the embodiment enables, for example, problems or dangerous situations such as future possible collisions of the tool with parts of the machine, or of parts of the machine against the workpiece, and excessive removals of material from the workpiece, to be checked visually in advance. The system may be rendered capable of stopping the execution of the machining on the machine tool, when it is enabled to detect the above-mentioned dangerous situations in advance.

FIG. 1 shows partially and schematically a machine tool M, which is associated with a predictive control and virtual display system according to the embodiment, generally indicated PS.

The machine tool M includes, in known manner, a tool-holder 2 which carries, for example, a milling tool T.

The machine tool M includes, in known manner, a housing, a support structure, and a table.

The machine M further includes a workpiece carrier 3 which carries a workpiece W to be machined and which can normally be updated dynamically during the machining.

A plurality of actuator devices (A1, ..., AN), for example, electric motors, are provided in the machine M and can be controlled by means of associated drive devices (D1, ..., DN) in order to bring about controlled relative displacements between the tool T and the workpiece W being machined, along respective axes.

Respective detector devices (S1, ..., SN) suitable for providing respective electrical signals or position data are associated with the actuators (A1, ..., AN).

A numerical controller NC is associated with the machine tool M. The numerical controller NC is connected to the drive devices (D1, ..., DN) and is arranged to implement a machining program which is predetermined according to the features of the workpiece to be produced and to the features of the machine tool M and of the tool T which are used. In particular, the numerical controller NC can calculate, on the basis of the machining program, the target coordinate values which define positions of the tool T along the axes of the machine M, which positions are to be reached by the activation of the associated actuator devices (A1, ..., AN).

The operator of the machine M can interact with the numerical controller NC by means of a control panel CP.

In the embodiment shown in FIG. 1, the predictive control system PS shares with the numerical controller NC an image display device ID and the or a module P of the numerical controller NC which uses the calculated target coordinate values. On the basis of these values, as well as of stored mathematical models of the workpiece W, of the machine M, and of the tool T, the module P generates image data signals which it supplies to the display device ID.

The control system PS is arranged in particular to generate image signals which enable a two-dimensional, virtual representation of the relative positions adopted by the machine M and by the workpiece W to be produced on the display device ID.

In particular, the control system PS is arranged to generate images which can selectively permit the production of an instantaneous, virtual, two-dimensional representation of the current positions of the workpiece W and of the tool T in real time. This representation in practice replaces the images which could be obtained, for example, by means of a video camera to show the operator what is happening at the time in question in the work zone of the machine tool M. The representation may be a predictive, virtual, two-dimensional representation of the positions adopted by the workpiece W, by the tool T and by the machine tool M from the start of the machining up to the end of the predictive window. The predictive window may be set by the operator of the machine M, for example, by means of the control panel CP.

The above-mentioned representations are advantageously produced on the basis of the target coordinate values calculated by the numerical controller NC and of the mathematic models of the machine tool M, of the tool-holder, of the tool T, of the clamping apparatus, of the dynamic unfinished workpiece, and of any theoretical model of the workpiece to be achieved upon completion of the machining.

Figure 2:
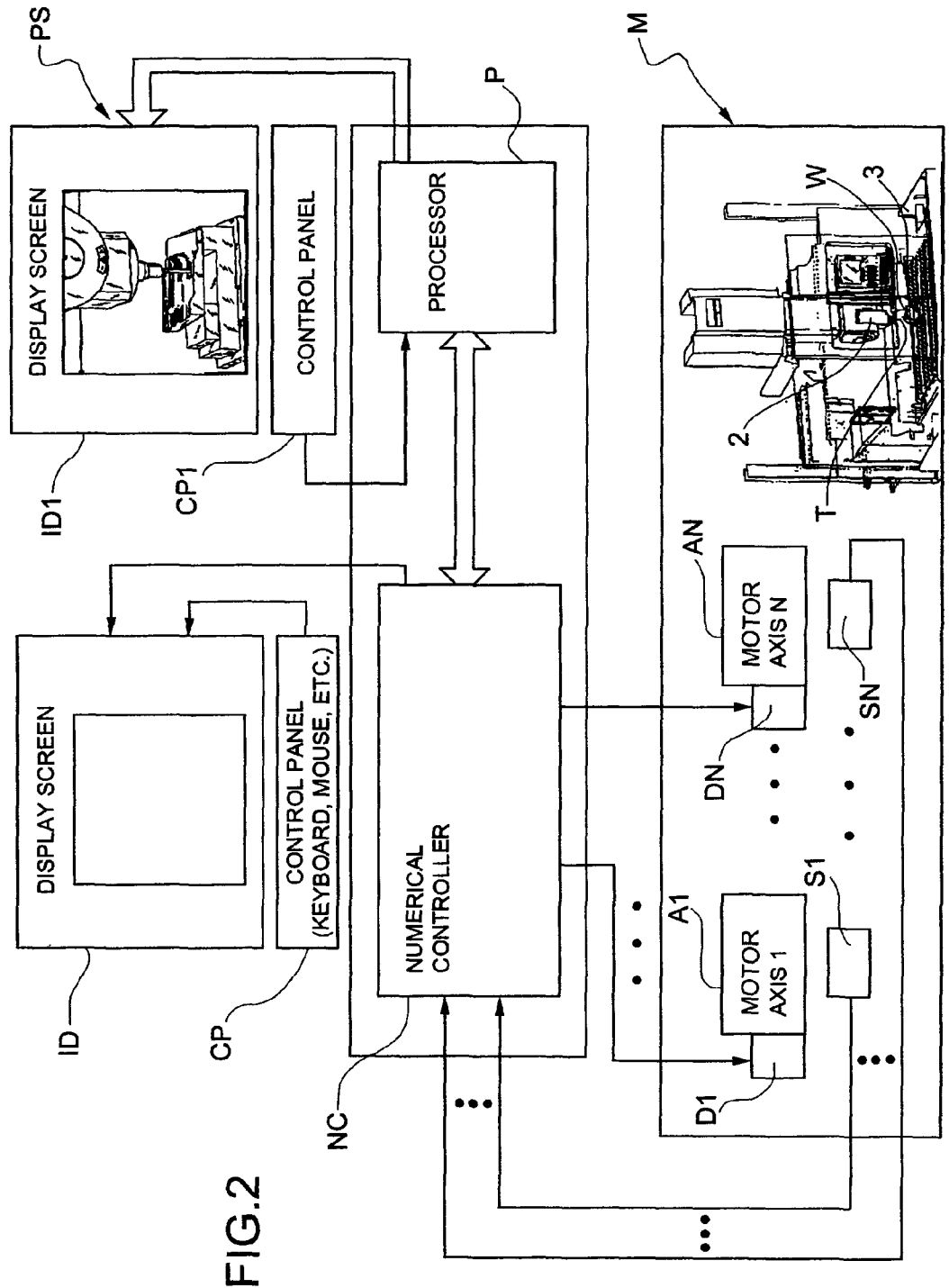
FIG. 2 is a block diagrams of another embodiment of a control and virtual display system for a machine tool according to the present embodiment.

FIG. 2 shows another embodiment of the present embodiment. In this drawing, parts and components that have already been described have again been attributed the alphanumeric references, which were used above.

In the embodiment of FIG. 2, the predictive control and display system PS includes its own control panel (keyboard and/or mouse, etc.) CP1, its own processor P, and its own display device ID1, which are separate from those (CP and ID) associated with the numerical controller NC.

Otherwise, the features and methods of operation of the system of FIG. 2 correspond to those already described with reference to the system of FIG. 1.

Figure 4:
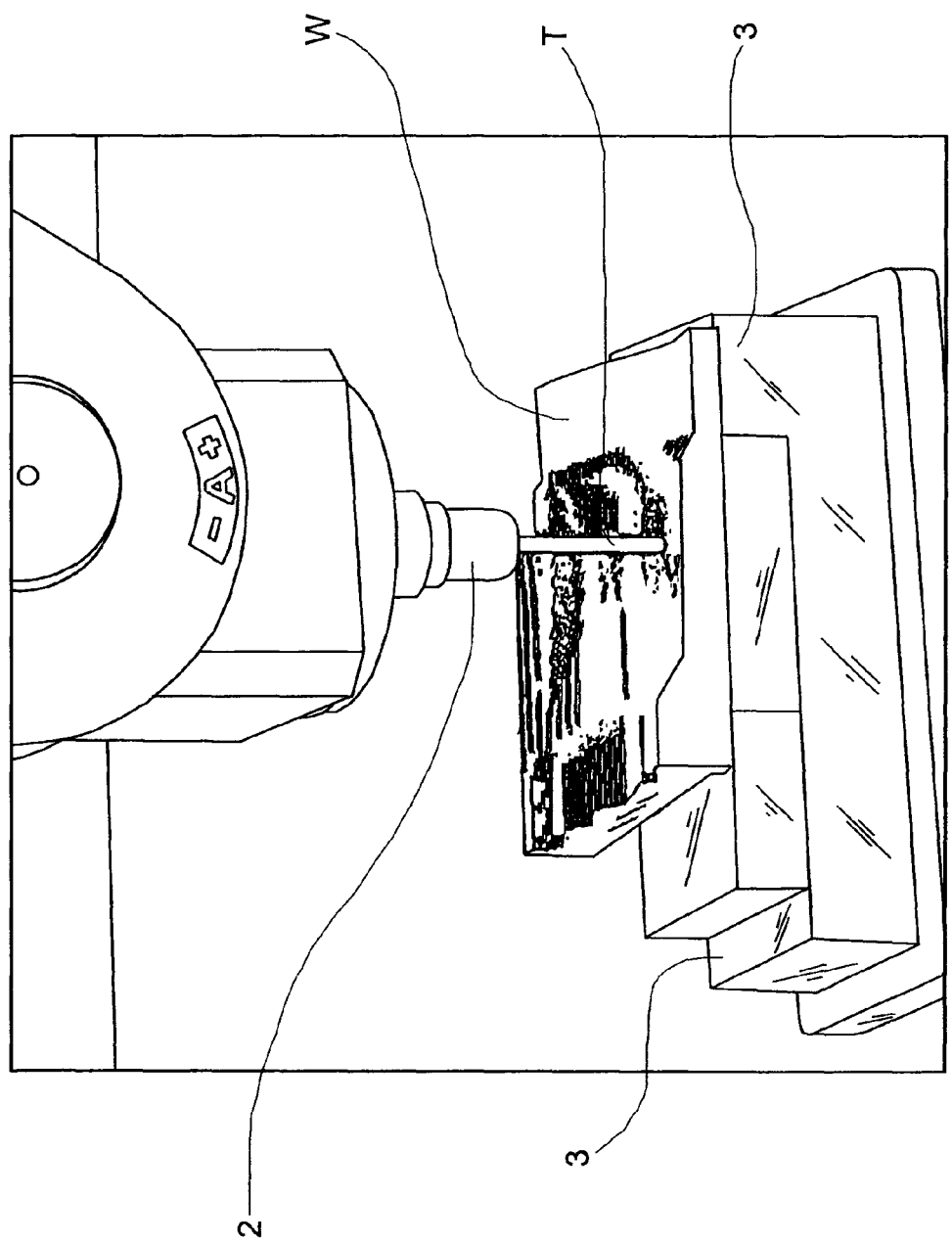
FIG. 4 shows an example of a virtual image formed in a system according to the present embodiment.

FIG. 4 shows, by way of example, a virtual, two-dimensional image which can correspondingly be presented on the display device ID. In this image, the alphanumeric symbols used above to distinguish the various parts have been added for ease of identification by the reader.

When the system is in use, the following sequence of steps can take place:
a) the operator of the machine tool selects the machining program;
b) the operator defines the predictive window;
c) the operator can display the virtual movements of the machine and of the tool to check the correctness of the machining program by displaying the position of the tool forward and backward within the predictive window;
d) the operator presses the start key and sets the speed of advance; the numerical controller brings about the movement of the axes of the machine in accordance with the machining program selected;
e) the operator of the machine tool can display the position of the tool and the axes of the machine relative to the workpiece in advance and according to the defined extent of the predictive window; and
f) if the operator wishes to make other checks he brings the value of the speed of advance to zero or stops the machine and the system returns to point c).

Figure 3:
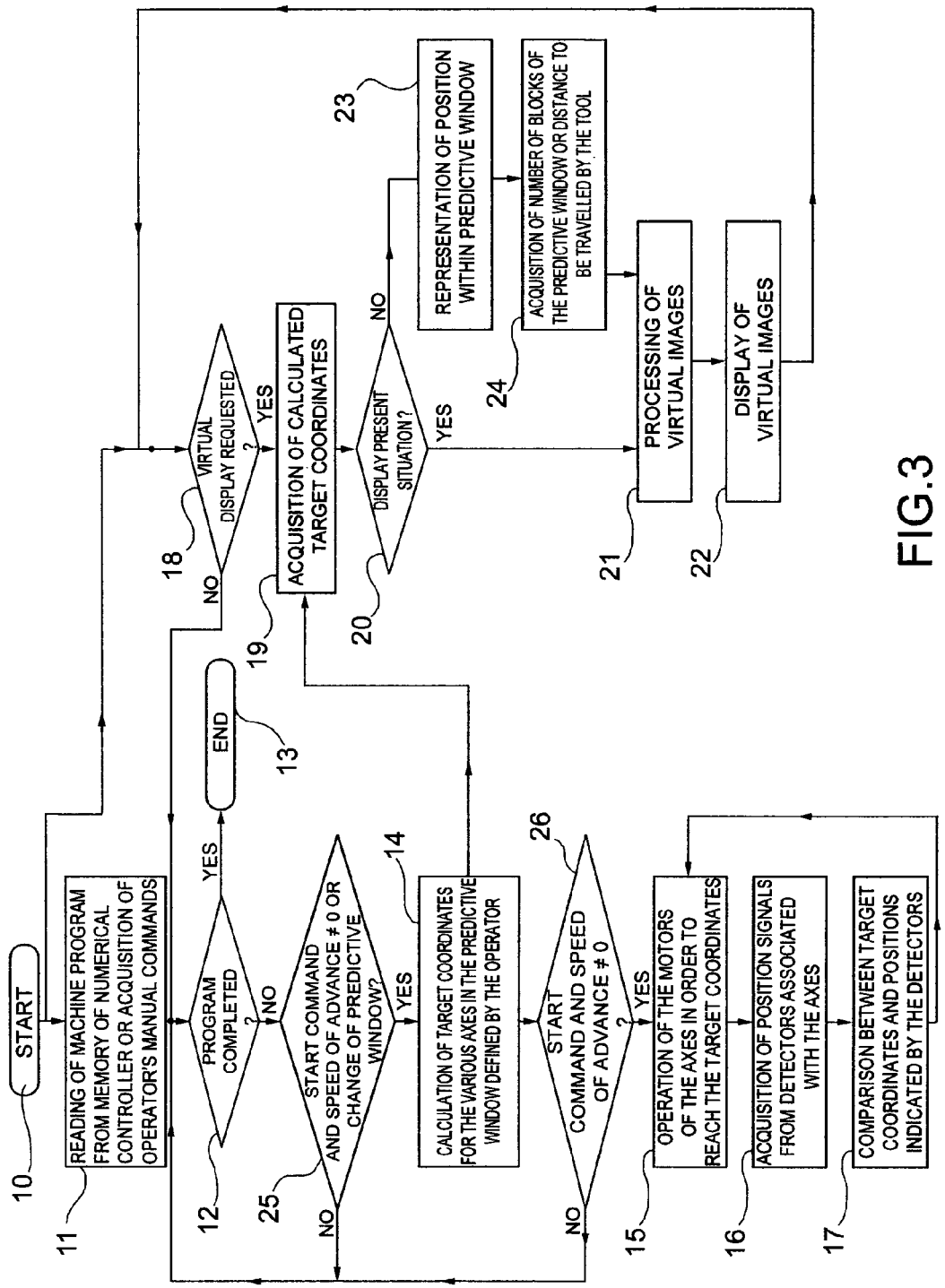
FIG. 3 is a flow chart illustrating the method of operation of a control and virtual display system according to the present embodiment.

FIG. 3 of the appended drawings shows a possible simplified flow chart of the steps, which can be performed with the predictive control and virtual display system described above.

In FIG. 3, the step for starting operation is indicated 10 and is followed by a step 11 for the reading, by the numerical controller NC, of the previously stored machining program, or for the acquisition of the manual commands imparted by the machine operator by means of the control panel CP.

There then follows a step 12 for checking whether the machining program is completed. If so, the process goes to an end step 13 whereas, if not, it goes to a step 25 in which it is checked whether the start command and the speed of advance are other than zero, or whether the operator has changed the amplitude of the predictive window. If not, the system returns to step 12; if so, it goes to a step 14 in which the numerical controller NC provides for the calculation of the target coordinates for the various axes of the machine tool M in the predictive window set by the operator.

This step is followed by a step 26 for checking of the start command and of the speed of advance; if they are zero the system returns to step 12, otherwise it goes to a step 15 for operation of the actuators (A1, . . . , AN) associated with the axes in order to reach the positions indicated by the target coordinates. There then follow a step 16 for the acquisition of the position signals provided by the detectors (S1, . . . , SN) associated with the axes and a step 17 in which the actual positions indicated by the detectors (S1, . . . , SN) are compared with the corresponding target coordinate values.

The differences between the actual positions and the target coordinates, or position errors, are used for the feedback adjustment of the actuators (A1, . . . , AN) associated with the axes of the machine tool M.

As a result of the starting of the process described above, in a step indicated 18 in the representation of FIG. 3, it is checked whether the user has requested the production of a virtual display of the machining in progress in the machine M. If so the system goes on to a step 19 in which the target coordinates calculated little by little by the numerical controller NC are acquired by the processing system PS.

In a subsequent step 20, it is checked whether the user has requested the generation of a virtual display, in real time, of what is happening at present in the work zone of the machine tool M. If so, the processing system PS processes the virtual, two-dimensional images in the next step 21 and these are then presented to the user on the display device ID in step 22.

If, on the other hand, in step 20, the user has not requested the virtual representation of the instantaneous work situation in real time, then the system can go on to step 23 in which a predictive, virtual, two-dimensional representation of the positions adopted by the machine M, by the workpiece W, and by the tool T from the start of the work and up to the end of the predictive window set by the operator is generated.

The end of the predictive window can be set by the operator by the indication of the corresponding number of program blocks corresponding to the future time window of interest or by indication of the distance to be travelled by the tool T, as indicated in step 24.

The processor then proceeds cyclically in accordance with the steps or stages indicated above.

The system PS can be arranged so that, during the normal carrying-out of a machining program, the virtual image corresponding to the end of the predictive window set is presented little by little on the display device ID.

The processing system PS can advantageously be arranged to check whether the calculated future positions of the tool T are liable to lead to any dangerous collisions with parts of the machine tool M or with the workpiece W and possibly to bring about the emission of an alarm signal and/or stoppage of the machining.

The processing system PS can also advantageously be arranged to calculate the following quantities:

the total amount of material to be removed from the workpiece W being machined;

the total remaining amount still to be removed from the workpiece W;

any excessive removals of material from the workpiece W.

The processing system PS can also calculate and adjust the speed of advance of the tool T on the basis of the volume of material removed from the workpiece W, of the nature of the material, of the kind of tool T used, and of the features of the machine tool M, and to estimate the remaining useful life of the tool T on the basis of these parameters.

Naturally, the principle of the embodiment remaining the same, the forms of embodiment and details of construction may be varied widely with respect to those described and illustrated purely by way of non-limiting example, without thereby departing from the scope of the embodiment as defined in the appended claims.

In various embodiments of the present invention, the disclosed methods for controlling a machine tool may be implemented as a computer program product for use with a computer system. Such implementations may include a series of non-transient computer instructions fixed either on a tangible storage medium, such as a computer readable medium (e.g., a diskette, CD-ROM, ROM, or fixed disk). In alternative implementations, the computer instructions may be or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A control and virtual display system for use while machining is in progress in a machine tool comprising:

a holder for a tool;

a carrier for a workpiece having features to be machined by the tool;

a plurality of actuator devices associated to and controllable by a drive to bring about relative displacements between the tool and the workpiece along respective axes;

a numerical controller configured to connect to the drive and is suitable for implementing a machining program that is predetermined according to the features of the workpiece to be produced and the features of the tool, the numerical controller being suitable for calculating, on the basis of the machining program, target coordinates defining positions of the tool along the axes, which positions are to be reached by the activation of the plurality of associated actuator devices;

an image display; and a processing system configured to interface to the numerical controller to receive the calculated target coordinate values, which is arranged to generate, while machining is in progress and on the basis of the target coordinates and of stored mathematical models of the machine tool, of the workpiece, and of the tool, image data suitable for producing on the image display a virtual, two-dimensional representation of a plurality of positions which will be adopted by the workpiece and by the machine tool in a pre-set predictive time window, wherein the processing system is arranged to calculate at least one of: a total amount of material to be removed from the workpiece in the pre-set predictive window, and a total remaining amount of material still to be removed from the workpiece up to the completion of the machining within the pre-set predictive window.

2. The control and virtual display system according to claim 1, wherein the processing system is arranged for selectively generating the image data suitable for producing, on the image display, an instantaneous, virtual, two-dimensional representation, in real time, of the positions of the workpiece and of the tool.

3. The control and virtual display system according to claim 1 further comprising a setting for selecting a parameter defining a window size of the predictive time window.

4. The control and virtual display system according to claim 1, wherein the processing system is arranged to check whether the plurality of positions which will be adopted by the workpiece and by the machine tool are liable to cause possible collisions.

5. The control and virtual display system according to claim 4, wherein the processing system is arranged to cause an emission of an alarm signal and/or to cause the machining to be stopped when the plurality of positions which will be adopted by the workpiece and by the machine tool are liable to cause possible collisions.

6. The control and virtual display system according to claim 1, wherein the processing system is arranged to calculate predictively possible future excessive removals of material from the workpiece.

7. The control and virtual display system according to claim 1, wherein the processing system is arranged to calculate and adjust a speed of advance of the tool on the basis of a volume of material removed from the workpiece, of a nature of the material, of a kind of tool used, and of features of the machine tool.

8. The control and virtual display system according to claim 7, wherein the processing system is arranged to estimate the remaining useful life of the tool.

9. The control and virtual display system according to claim 1, wherein the processing system is arranged to bring about, in increment, while the machining program is being carried out, the presentation, on the image display, of a virtual image corresponding to the end of the predictive window set.

10. A method to control a machine tool comprising:
receiving a machining program for a machine tool determined according to a workpiece to be produced and a tool to machine the workpiece;
calculating, via a processor, a plurality of target coordinate values on the basis of the machining program, the plurality of target coordinate values defining a plurality of positions of the tool along axes of the machine tool;
while machining is in progress, generating image data on the basis of the plurality of target coordinate values and of stored mathematical models of the machine tool, of the workpiece, and of the tool, the image data being a virtual, two-dimensional representation of the plurality of positions to be adopted by the workpiece and by the machine tool in a pre-set, predictive time window;
displaying the image data; and further comprising:
calculating a total amount of material to be removed from the workpiece and/or a total remaining amount of material still to be removed from the workpiece up to the completion of the machining within the pre-set predictive time window.

11. The method according to claim 10, wherein the plurality of target coordinates defining the plurality of positions are determined based upon activation of a plurality of associated actuator devices associated to and controllable by a drive to bring about relative displacement between the tool and the workpiece.

12. The method according to claim 10, wherein the image data is generated in real time.

13. The method according to claim 10 further comprising a parameter defining a window size of the predictive time window.

14. The method according to claim 10 further comprising:
checking, via the processor, whether the plurality of positions to be adopted by the workpiece and by the machine tool are liable to cause possible collisions.

15. The method according to claim 14 further comprising:
performing at least one of emitting an alarm signal and/or causing the machining to be stopped when the plurality of positions to be adopted by the workpiece and by the machine tool are liable to cause possible collisions.

16. The method according to claim 10 further comprising:
calculating and adjusting an advancing speed of the tool on the basis of a volume of material removed from the workpiece, of the nature of the material, of the kind of tool used, and of the features of the machine tool.

17. The method according to claim 10, further comprising:
while the machining program is being carried out, presenting, in increments, virtual image corresponding to the end of the "predictive time window" set.

18. A computer program product for controlling a machine tool, the computer program product comprising a non-transitory computer-readable medium having computer readable program code stored thereon, the computer readable program code configured to:
receive a machining program for a machine tool determined according to a workpiece to be produced and a tool to machine the workpiece;
calculate a plurality of target coordinate values on the basis of the machining program, the plurality of target coordinate values defining a plurality of positions of the tool along axes of a machine tool;
while machining is in progress, generate image data on the basis of the plurality of target coordinate values and of stored mathematical models of the machine tool, of the workpiece, and of the tool, the image data being a virtual, two-dimensional representation of the plurality of positions to be adopted by the workpiece and by the machine tool in a pre-set "predictive time window";
display the image data; and further comprising:
calculating a total amount of material to be removed from the workpiece and/or a total remaining amount of material still to be removed from the workpiece up to the completion of the machining within the pre-set predictive time window.

\* \* \* \* \*